US012322401B2

(12) United States Patent
Gish et al.

(10) Patent No.: US 12,322,401 B2
(45) Date of Patent: Jun. 3, 2025

(54) USE OF SYMBOL STRENGTH AND VERIFIED WATERMARK DETECTION AS BASIS TO IMPROVE MEDIA-EXPOSURE DETECTION

(71) Applicant: The Nielsen Company (US), LLC, New York, NY (US)

(72) Inventors: David Gish, Riverdale, NJ (US); Jeremey M. Davis, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 242 days.

(21) Appl. No.: 18/329,234

(22) Filed: Jun. 5, 2023

(65) Prior Publication Data

US 2024/0404535 A1 Dec. 5, 2024

(51) Int. Cl.
*G10L 19/018* (2013.01)

(52) U.S. Cl.
CPC .................................. *G10L 19/018* (2013.01)

(58) Field of Classification Search
CPC ..................................................... G10L 19/018
See application file for complete search history.

(56) References Cited

U.S. PATENT DOCUMENTS 9,912,986 B2 * 3/2018 Eyer .................. H04N 21/8358
12,256,121 B2 * 3/2025 Lynch ................ H04N 21/4394
2011/0119065 A1 * 5/2011 Pietrusko ............. G11B 27/036 704/500
2012/0239407 A1 * 9/2012 Lynch ................... G06F 16/683 704/500
2014/0236592 A1 * 8/2014 Neuhauser ............. H04H 60/58 704/231
2015/0039320 A1 * 2/2015 Neuhauser ............ G10L 19/018 704/500
2015/0221316 A1 * 8/2015 Mufti .................... G10L 19/018 700/94
2017/0148126 A1 * 5/2017 Srinivasan ............ G06T 1/0071

(Continued)

FOREIGN PATENT DOCUMENTS

CA 2791046 A1 * 9/2011 ............. G10L 19/00
CN 101263552 A * 9/2008 ........... G10L 19/018

(Continued)

*Primary Examiner* — Mohammad K Islam
(74) *Attorney, Agent, or Firm* — McDonnell Boehnen Hulbert & Berghoff LLP

(57) ABSTRACT

To extract an identifier value from a watermark in media content, a system initially determines the identifier by determining symbol values based on an evaluation of tone strength of each of multiple symbol time segments of the watermark. Further, the system assigns a quality level to the watermark, based on a count of errors in the determined symbol values in view of one or more watermark-structure rules. Still further, if the quality level is threshold low, then the system engages in an error correction process that takes into account, for each symbol time segment whose symbol value may be erroneous, whether that symbol time segment has a threshold strong tone combination that matches the tone combination of a corresponding symbol time segment in a verified watermark. And if the error correction process is successful, the system replaces the determined identifier value with the identifier value of the verified watermark.

20 Claims, 4 Drawing Sheets

(56) References Cited

U.S. PATENT DOCUMENTS

| | | | | |
|---|---|---|---|---|
| 2018/0336657 | A1* | 11/2018 | Nielsen | G10L 19/018 |
| 2019/0007729 | A1* | 1/2019 | Heffernan | H04H 60/43 |
| 2020/0183973 | A1* | 6/2020 | Balcers | G10L 19/018 |
| 2020/0221169 | A1* | 7/2020 | Heffernan | H04H 60/37 |
| 2020/0312340 | A1* | 10/2020 | Hudson | G06F 16/683 |
| 2021/0233204 | A1* | 7/2021 | Alattar | G10L 19/018 |
| 2021/0304776 | A1* | 9/2021 | Li | G10L 19/018 |
| 2024/0404535 | A1* | 12/2024 | Gish | G10L 19/018 |

FOREIGN PATENT DOCUMENTS

| | | | | | |
|---|---|---|---|---|---|
| CN | 108648761 | A | * | 10/2018 | G10L 19/018 |
| CN | 105976823 | B | * | 9/2019 | G10L 19/018 |
| CN | 111091841 | A | * | 5/2020 | G06F 21/16 |
| CN | 116312510 | A | * | 6/2023 | |
| EP | 3133597 | A1 | * | 2/2017 | |
| WO | WO-0249363 | A1 | * | 6/2002 | G10L 19/018 |
| WO | WO-2010081931 | A1 | * | 7/2010 | G06F 21/10 |
| WO | WO-2023004159 | A1 | * | 1/2023 | G06F 21/64 |

* cited by examiner

Decoder Symbol Strength Table

Conceptual example, with strength values 0-99

12 Symbol Positions, 4.8 seconds

| Winning Symbols | X | 1 | 2 | 3 | Y | 5 | 6 | 7 | 1 | 2 | 3 | 4 |
|---|---|---|---|---|---|---|---|---|---|---|---|---|
| Symbol Value 0 | 68 | 25 | 58 | 47 | 4 | 12 | 6 | 11 | 24 | 48 | 46 | 46 |
| Symbol Value 1 | 50 | **91** | 41 | 20 | 16 | 23 | 15 | 50 | **85** | 6 | 54 | 22 |
| Symbol Value 2 | 59 | 24 | **77** | 35 | 47 | 5 | 26 | 9 | 20 | **86** | 38 | 51 |
| Symbol Value 3 | 23 | 49 | 42 | **82** | 55 | 6 | 34 | 67 | 73 | 54 | **92** | 59 |
| Symbol Value 4 | 6 | 9 | 52 | 27 | 14 | 15 | 47 | 21 | 5 | 58 | 19 | **75** |
| Symbol Value 5 | 53 | 34 | 11 | 33 | 34 | **87** | 3 | 58 | 64 | 33 | 49 | 10 |
| Symbol Value 6 | 51 | 61 | 29 | 54 | 61 | 13 | **89** | 47 | 34 | 6 | 61 | 22 |
| Symbol Value 7 | 30 | 32 | 22 | 36 | 68 | 9 | 21 | **78** | 71 | 58 | 58 | 42 |
| Symbol Value 8 | 49 | 28 | 37 | 51 | 36 | 22 | 75 | 60 | 37 | 32 | 37 | 67 |
| Symbol Value 9 | 65 | 61 | 15 | 57 | 16 | 10 | 6 | 66 | 11 | 69 | 15 | 44 |
| Symbol Value 10 | 43 | 55 | 54 | 70 | 20 | 15 | 64 | 18 | 30 | 16 | 61 | 36 |
| Symbol Value 11 | 38 | 37 | 29 | 58 | 73 | 53 | 13 | 67 | 53 | 46 | 4 | 14 |
| Symbol Value 12 | 46 | 35 | 73 | 22 | 72 | 31 | 31 | 3 | 20 | 2 | 41 | 24 |
| Symbol Value 13 | 8 | 70 | 59 | 47 | 20 | 51 | 15 | 47 | 39 | 44 | 4 | 12 |
| Symbol Value 14 | 12 | 26 | 19 | 36 | 38 | 26 | 4 | 45 | 69 | 11 | 8 | 60 |
| Symbol Value 15 | 40 | 24 | 3 | 61 | 38 | 67 | 24 | 9 | 31 | 50 | 35 | 14 |
| Symbol Value X | **86** | 70 | 33 | 19 | 69 | 24 | 71 | 5 | 44 | 12 | 71 | 73 |
| Symbol Value Y | 1 | 54 | 3 | 26 | **79** | 49 | 5 | 0 | 12 | 21 | 37 | 62 |

Fig. 2

USE OF SYMBOL STRENGTH AND VERIFIED WATERMARK DETECTION AS BASIS TO IMPROVE MEDIA-EXPOSURE DETECTION

BACKGROUND

In order to measure exposure of people to media content such as radio, television, online media, and/or commercial media, a media-monitoring company can arrange for a representative population of users to implement media-monitoring devices, i.e., meters, designed to detect hidden identification tones embedded in the media content and to log and report their findings.

These meters could take various forms and could be provided and operated in various locations. By way of example, some meters may be configured for use in a fixed location such as a household, possibly to be attached by cables to devices such as televisions, set top boxes, or routers, and/or provided as separate devices, and arranged to monitor media signals flowing to or from those devices and/or to monitor acoustic audio output and/or wirelessly transmitted media signals. Further, other meters may be portable, arranged to be worn or otherwise carried by users as they move about and to passively monitor acoustic audio and/or other media signals in the users' environment. In addition, some meters may be integrated with devices, such as mobile phones, televisions, set top boxes, routers, or the like, and similarly configured to monitor media content in various ways.

BRIEF DESCRIPTION OF THE DRAWINGS

FIG. 2 is a decoder signal-strength table that could be established to facilitate watermark decoding.

DETAILED DESCRIPTION

In an example system, the hidden identification tones could define audio watermarks. For instance, each of various broadcast stations (e.g., stations or channels provided through over the air broadcast, cable or satellite TV transmission, or over-the-top streaming, among other possibilities) could be watermarked with a respective station identification or "SID" value, to enable meters to detect and report media presentation on a per station basis. Further, to allow meters to regularly monitor media exposure, the audio media of each broadcast station could be repeatedly watermarked with the station's respective SID value.

Each instance of such a watermark could be encoded in the audio media by adding into the audio media a supplemental audio signal that is preferably outside the range of human hearing but that is detectable and interpretable by a suitably-configured meter to represent the SID value and possibly other information such as a watermark timestamp.

For example, each instance of the watermark could be encoded into the audio media as a sequence of values over a respective watermark time duration, by adding into the audio media a sequence of symbols defining tone-combinations that correspond with the sequence of values. In particular, each value in the sequence of values could be selected from a predefined set of values, and each value in the predefined set of values could have predefined correspondence with a respective combination of tones or frequency components different than each other value in the set. The process of encoding each successive value of the watermark's sequence of values of into the audio media could thus involve adding into the audio media a respective symbol in the form of that value's corresponding tone-combination.

As a result, the watermark as encoded in the audio media could span the watermark time duration divided into a sequence of symbol time segments, encoding a respective identifier value by including a sequence of symbols respectively in the sequence of symbol time segments, each symbol having a respective tone combination that corresponds with a respective symbol value.

The sequence of symbols that therefore make up a representative instance of the watermark in the audio media could include one or more synchronization symbols that help demarcate or define the structure of the watermark, as well as one or more payload symbols, such as symbols representing digits of the SID and symbols representing digits of an encoding timestamp. The specific configuration of the watermark could take any of a variety of forms.

Figure 1:
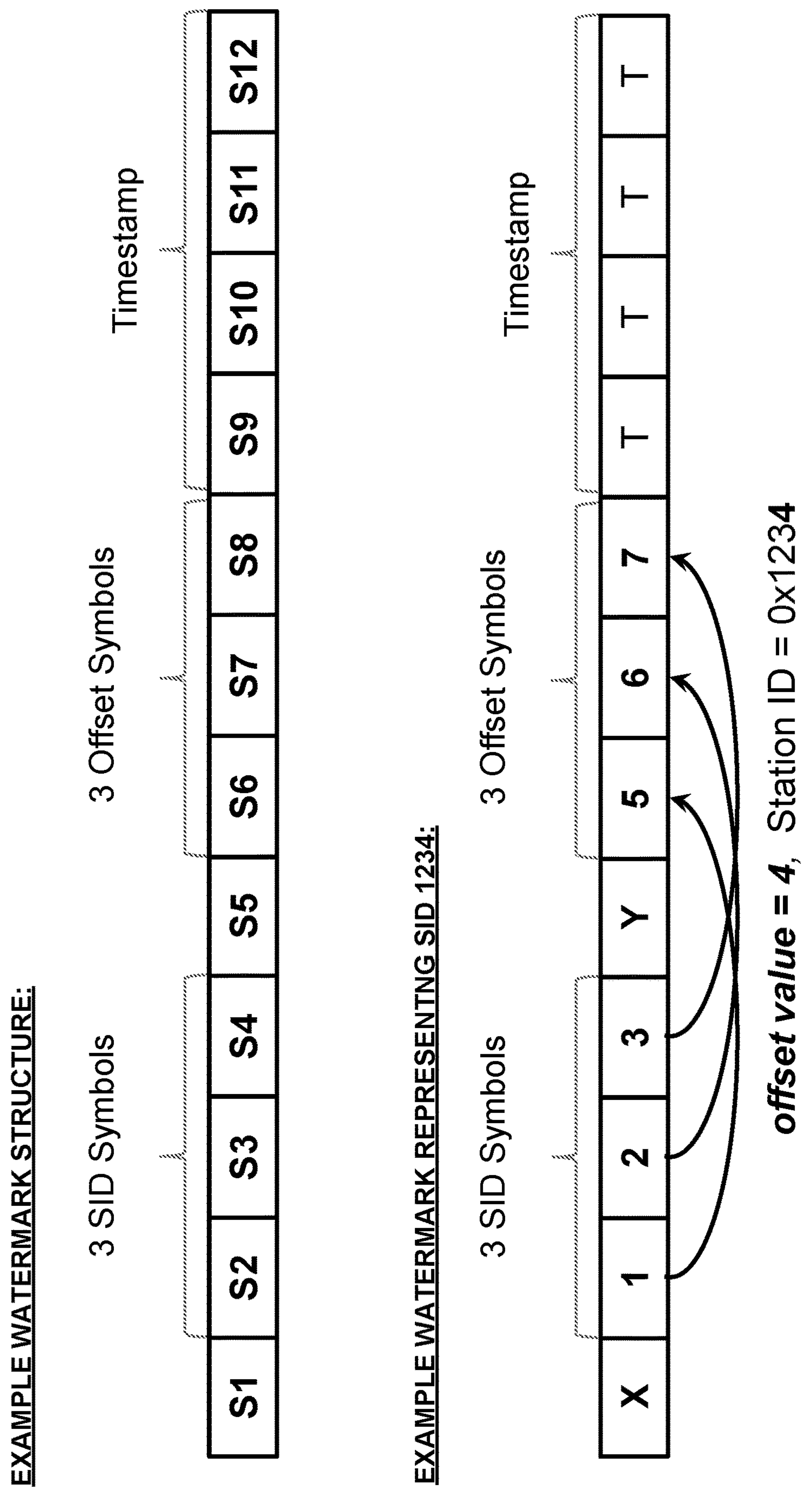
FIG. 1 is a simplified illustration of an example watermark.

Without limitation, FIG. 1 illustrates the structure of an example watermark. This example watermark represents an example 4-digit SID value along with an example 4-digit timestamp, and the watermark duration could be 4.8 seconds, with the watermark being repeatedly encoded into each 4.8 seconds of a given station's audio media. Each instance of this watermark could further be an example sequence of 12 symbol time segments {S1 . . . . S12} that are each 0.4 seconds long, each of which could represent a value by containing a respective combination of 10 tones deemed to correspond respectively with that value.

In this example watermark, symbol time segments S1 and S5 could respectively encode values that function as synchronization markers, illustrated in the figure as values X and Y. Further, symbol time segments S2, S3, and S4 could respectively encode the first three digits of the 4-digit SID, and symbol time segments S6, S7, and S8 could respectively encode values that are offset respectively from the first three digits of the SID by an offset value equal to the fourth digit of the SID, thus representing the fourth digit of the SID by that offset while also functioning to facilitate error correction. Still further, the remaining four symbol time segments of the watermark could respectively encode the example four digits of an encoding timestamp (e.g., indicating when the watermark was encoded into the audio media).

A meter, which may be associated with a panelist (i.e., a person who would consume media) and may be positioned in the panelist's household and/or carried as a mobile device by the panelist among other possibilities as noted above, may then be operate alone or in combination with one or more other devices or systems to detect such watermarks as an indication that the panelist was exposed to associated broadcast stations, and to log and report those findings.

For instance, the meter may include one or more microphones for receiving acoustic audio in the panelist's environment. Further, the meter may include a computing system having one or more processors for processing the received audio, to monitor for presence of such watermarks and for reading the SID from the detected watermark and logging and reporting that the panelist was exposed to the broadcast station having that SID.

Alternatively or additionally, a representative computing system could be distributed between the meter and a separate device such as a cloud server, with the meter functioning to evaluate one or more aspects of the received audio and to pass results of that evaluation along to the separate device, and with the separate device functioning to analyze the raw data to ascertain the SID and to log and report that the panelist was exposed to the broadcast station having that SID. For simplicity and without limitation, the following description will discuss a scenario where the meter conducts all of this processing and may report the results as measurement data to a cloud server or other system. It should be understood that numerous variations are possible as well.

To detect the presence of the example watermark in the audio received from the panelist's environment, the meter may analyze the received audio to determine what frequency components the audio contains over time and what the energy levels (e.g., signal to noise ratio (SNR)) of those frequency components are. For instance, the meter could digitize the received audio signal and compute a discrete Fourier transform in order to determine the frequency components respectively in each 0.4-second symbol segment of the audio.

In the example where each symbol time segment respectively encodes a value with a corresponding set of 10 tones, for instance, the meter could determine for each 0.4-second symbol segment the aggregate SNR respectively of each of various possible 10-tone combinations in that symbol time segment, and the meter could then select as the winning 10-tone combination the 10-tone combination that has the highest determined SNR. For each such symbol time segment, the meter could then designate as the winning symbol value, i.e., as the value represented by the symbol time segment, the value that corresponds with the selected winning 10-tone combination. Through this process, the meter may first detect the presence of synchronization symbol time segment S1 (e.g., a symbol having winning value X), and the meter may then evaluate succeeding 0.4-second segments of the audio in order to decode the four digits of the SID.

With the example 4.8-second watermark having a sequence of twelve 0.4-second symbol time segments as shown in FIG. 1, for instance, the meter could programmatically develop for each instance of the watermark a "decoder signal-strength table" as shown by way of example in FIG. 2, and could use this table as a basis to determine the SID represented by the watermark. Further, the meter could store this signal-strength table per watermark for later reference as well.

As shown in the example table of FIG. 2, for a given watermark, the meter could designate, respectively for each 0.4-second symbol time segment of the watermark, a meter-determined SNR value (e.g., aggregate SNR value) respectively for each of the possible 10-tone combinations, i.e., for each of the possible symbol values {0, 1, . . . 15, X, Y}. Further, as shown by shading in the figure, the meter could determine and flag for each symbol time segment a winning symbol value, namely, the symbol value whose corresponding 10-tone combination the meter determined to be strongest in that symbol time segment.

Thus, in the example shown, the meter may first detect the presence of the synchronization symbol time segment S1 by determining that a 0.4-second symbol time segment has symbol value X, based on a determination that the strongest 10-tone combination in that symbol time segment is the 10-tone combination that corresponds with symbol value X. (Namely, the meter may compare its determined SNR values for all of the possible 10-tone combinations in that time segment, and thus for all of the possible symbol values, and may find that the symbol value X has the highest SNR (i.e., 86)—thus making symbol value X the winning symbol value for that symbol time segment.) The meter may therefore fill in the top row of the first column of the table with value "X", which indicates that that 0.4-second segment of audio is synchronization symbol time segment S1 having value X.

In turn, the meter may conduct the same analysis for each subsequent 0.4-second segment of the audio, finding for each 0.4-second segment the strongest 10-tone combination and thus the winning symbol value, and filling in these winning symbol values in the first row of the table. As a result, the example table that the meter establishes for a given watermark may indicate in its first row the sequence of values that the meter determines to be represented by the watermark.

In line with the discussion above, this determined sequence of values could indicate in a coded manner the SID represented by the watermark. For instance, as discussed above, the symbols in time segments S2, S3, and S4 could represent the first three digits of the SID, and the symbols in time segments S6, S7, and S8 could establish the fourth digit of the SID by representing values that are offset from the first three digits of the SID by an offset value equal to the fourth digit of the SID. With this example, given the example values in the table of FIG. 2, the meter could deem the watermark to represent SID value 1234, because S2, S3, and S4 have winning values 1, 2, and 3 respectively, and because S6, S7, and S8 have winning values 5, 6, and 7 that are each offset from the first three winning values by a value of 4. (As further noted above, the remaining four symbol time segments of the example watermark may cooperatively represent an encoding timestamp.)

With this or other examples, when the meter determines the SID represented by a watermark, the meter may determine and assign a quality level to the SID determination for that watermark, which could represent the meter's level of confidence in the SID determination. Further, the meter may include this determined quality level with its report of the determined SID value for that watermark.

This determined quality level per SID determination could optimally be used as a basis to weigh the significance of the meter's reported media-measurement data, which could help govern the extent to which a device or system would rely on the data as a basis to take actions such as controlling ad placement or the like. For instance, if the meter indicates that it is very confident in its SID determinations, then a media-measurement company, an advertiser, and/or one or more other entities may give more weight to those SID determinations in relying on the media-measurement data as a basis to control ad placement or to take other actions. Whereas, if the meter indicates that it has low confidence in its SID determinations, then such an entity may give less weight to those determinations, possibly not relying on them at all as a basis to control ad placement or to take other actions.

In an example implementation, for each watermark, the meter could gauge the quality level of the meter's SID determination based on an evaluation of apparent errors in the symbol values that the meter determined for the watermark. The meter may carry out this evaluation with respect to just the first eight symbol time segments of the watermark, among other possibilities. With those first eight symbol time segments, for instance, the meter may deem the SID determination to have a highest quality level of 8 if the meter identifies no apparent errors in the determined symbol values, and the meter may deduct a point from that quality level for each apparent error that the meter finds.

Errors that the meter may find in the determined symbol values for the watermark could take various forms. For instance, the errors could relate to apparent violations of predefined rules regarding expected watermark content or structure, among other possibilities.

By way of example, given that symbol time segment S5 of the example watermark should be a synchronization symbol having value X, if the meter finds that symbol time segment S5 has a value other than X, then the meter may deem that to be an error and therefore deduct a point from the quality level for the SID determination. As another example, if there is a rule that the first three digits of the SID need to be unique, and if the meter finds that two of those digits are the same as each other, then the meter may deem that to be one or two errors and therefore deduct one or two points from the quality level for the SID determination.

As still another example, given that the error-correction symbols (of segments S6, S7, or S8) in the example watermark should have values that are offset from first three SID digits by the same offset value as each other (representing the fourth SID digit), if the meter finds that a given one of the error-correction symbol values is offset from a corresponding one of the first three SID digits by a different offset value than the other two error-correction symbol values, the meter may likewise deem that to be one or two errors and therefore deduct one or two points from the quality level for the SID determination.

And as yet another example, if there is a rule that the offset of each error-correction symbol value from a corresponding SID digit needs to be non-zero and if the meter finds that one of the error-correction symbol values is offset by zero from a corresponding SID digit (i.e., is the same as the corresponding SID digit), then the meter may likewise deem that to be one or two errors and therefore detect one or two points from the quality level for the SID determination.

Through this process in the non-limiting example, if the meter finds no such errors in its decoding of a watermark, then the meter may assign and report a quality value of 8 to its SID determination for that watermark. Whereas, if the meter finds one or more errors in its decoding of a watermark, then the meter may deduct a corresponding number of points from the quality value of its SID determination for that watermark. In an example implementation, if the resulting quality level for a watermark is less than or equal to 6, then the meter's SID determination for that watermark may be deemed inconclusive; in other words, in that situation, the meter's decoding of that watermark may be deemed inconclusive. In that situation, the meter may forgo reporting such inconclusive results.

Various reasons may exist for these errors in watermark decoding. For instance, noise in the meter's environment may cause the meter to incorrectly read one of the SID digits as a value different than what was encoded in the watermark. This could happen if the noise reduces the SNR of one or more of the frequency components underlying the associated symbol, or if the noise adds one or more strong frequency components to the symbol time segment, among other possibilities.

In some media-measurement systems, this or other such degradation in watermark decoding from time to time may not be a concern, since the meter may roll up and report media exposure data with a temporal granularity that is much lower than the duration of any individual watermark or even of several watermarks in a row. For instance, some systems may call for reports of media exposure on a per minute basis. So in such a system, if the bulk of SID readings within a given minute are all the same SID, a meter could disregard aberrant readings within that minute.

Unfortunately, however, other (e.g.,. more recent) media-measurement systems may not be so tolerant, as they may require reporting of media exposure with much higher temporal granularity, on a sub-minute basis. For instance, some media-measurement systems may require that the meter log and report media-exposure data for every 6 seconds or every 10 seconds. Given that requirement, it may be unacceptable or commercially impractical for the meter to omit one or more SID readings in a row or even for the meter to provide one or more low-quality SID readings in a row.

The present disclosure provides a mechanism to help address this problem. In accordance with the disclosure, a meter that operates to decode and read SIDs from successive watermarks in audio media could engage in a predictive-error-correction (PEC) process to help address one or more instances of degraded watermark decoding, such as watermark decoding that produces low quality SID readings. The meter may carry out this PEC process through analysis of the results of its watermark-decoding efforts over time.

In an example implementation, the meter may carry out the PEC process to help improve the meter's SID determination for a given watermark, based on a comparison with the meter's SID determination for a relatively recent "verified watermark".

To facilitate this in a non-limiting example, the meter may regularly evaluate its SID determinations to determine for each successive watermark whether to classify the watermark as a "verified watermark." Characterizing a watermark as a "verified watermark" may establish that the SID that the meter decoded from that watermark is a very reliable identifier of media content in the panelist's environment. (This may therefore also amount to characterizing the SID represented by that watermark as a "verified SID"). Without limitation, the meter may deem a particular watermark to be a verified watermark responsive to (i) the meter having assigned to its SID determination for that particular watermark at least a predefined threshold high quality level, perhaps the highest possible quality level, e.g., 8, and (ii) the meter also having decoded the same SID value, also with at least the threshold high quality level, from another watermark within a first predefined threshold short timeframe, e.g., 12 hours or 24 hours, before the particular watermark.

When the meter determines that a particular watermark is a verified watermark, the meter may then proceed to apply the PEC process to each succeeding low-quality watermark that occurs with expected watermark timing within a second predefined short timeframe, such as 5, 7, 10, or 15 minutes, after the verified watermark, i.e., relatively soon after the verified watermark.

For instance, with the example watermark structure discussed above, once the meter determines that a particular watermark is a verified watermark, the meter may then identify as a "watermark at issue" each watermark that meets at least the following three criteria: (i) the meter assigned to the SID determination for the watermark at issue a threshold low quality level, perhaps anything lower than the highest possible quality level, among other possibilities, (ii) the watermark at issue occurs an integer multiple of the watermark period of 4.8 seconds after the verified watermark, and (iii) the watermark at issue occurs within the second predefined threshold short time frame after the verified watermark. The meter may thus carry out the PEC process as to each such watermark at issue, using the verified watermark as a benchmark for comparison.

(Note that, while the verified watermark in the example implementation would be present in the audio media threshold recently before the watermark at issue, it may also be possible to carry out this process with respect to a verified watermark that is present in the audio media threshold soon after the watermark at issue. This may work well as an alternative implementation, for instance, in a post-processing implementation, among other possibilities.)

The PEC process could involve programmatically evaluating each of one or more symbol time segments of the watermark at issue to determine whether that symbol time segment of the watermark at issue contains a threshold strong tone combination that matches the tone combination that the verified watermark has in the corresponding symbol time segment.

For instance, in carrying this process out as to symbol time segment S3 of the watermark at issue, the meter may (i) determine what the winning tone combination is in symbol time segment S3 of the verified watermark and then (ii) determine if that particular tone combination is threshold strong in the symbol time segment S3 of the watermark at issue. Likewise, in carrying out this process as to symbol time segment S5 of the watermark at issue, the meter may (i) determine what the winning tone combination is in symbol time segment S5 of the verified watermark and then (ii) determine if that particular tone combination is threshold strong in the symbol time segment S5 of the watermark at issue.

As to a given symbol time segment of the watermark at issue, the act of determining whether the winning tone combination of the corresponding symbol time segment of the verified watermark is threshold strong in the given symbol time segment of the watermark at issue could take various forms.

Without limitation, the question could be whether that tone combination is threshold strong compared with all of the other candidate tone combinations in the given symbol time segment of the watermark at issue. The meter could determine this, for instance, by (i) computing a ratio of the determined signal strength of that tone combination to an average of the signal strength of all of the other possible tone combinations in the given symbol time segment of the watermark at issue and (ii) determining whether that computed ratio is at least as strong as a predefined threshold level. This is effectively a SNR analysis, evaluating whether the tone combination at issue is strong enough compared with other tone combinations in the given symbol time segment of the watermark at issue. If the meter thereby determines that the winning tone combination of the corresponding symbol time segment of the verified watermark is threshold strong compared with all of the other candidate tone combinations in the given time segment of the watermark at issue, then the meter may conclude that that tone combination is threshold strong in the given symbol time segment of the watermark at issue.

The meter could carry out this analysis for each symbol time segment of a set of one or more symbol time segments of the watermark at issue. For instance, the meter could carry out this analysis for each of the symbol time segments that the meter deemed to have erroneous or potentially erroneous symbol-value determinations in the watermark at issue, responsive to those error determinations. Alternatively, the meter could carry out this analysis for all of the symbol time segments of watermark at issue. Other examples may be possible as well.

Based on this analysis, the meter may determine whether the answer is affirmative for all of the analyzed symbol time segments of the watermark at issue, i.e., whether it is the case that, in each analyzed symbol time segment of the watermark at issue, the winning tone combination of the corresponding symbol time segment of the verified watermark is threshold strong.

If so, then, based at least on that determination, the meter may reasonably conclude that the SID represented by the watermark at issue is probably the same as the SID determined for the verified watermark. In that case, the meter may correct (or, in some cases, confirm) its SID determination for the watermark at issue to be the SID that it determined for the verified watermark. Further, in that case, the meter may also set the quality level for that SID determination to be a predefined quality level, such as 7 (i.e., in the example, one less than the highest level), among other possibilities.

Whereas, if not (i.e., if the meter does not determine that the answer is affirmative for all of the analyzed symbol time segments of the watermark wat issue), then the meter may maintain whatever quality level it had set for that SID determination and proceed as it would otherwise in view of on that SID determination. Alternatively, if the meter can partially correct the SID determination through this process, the meter may increase the quality level of the SID determination to some lesser extent.

Figure 3:
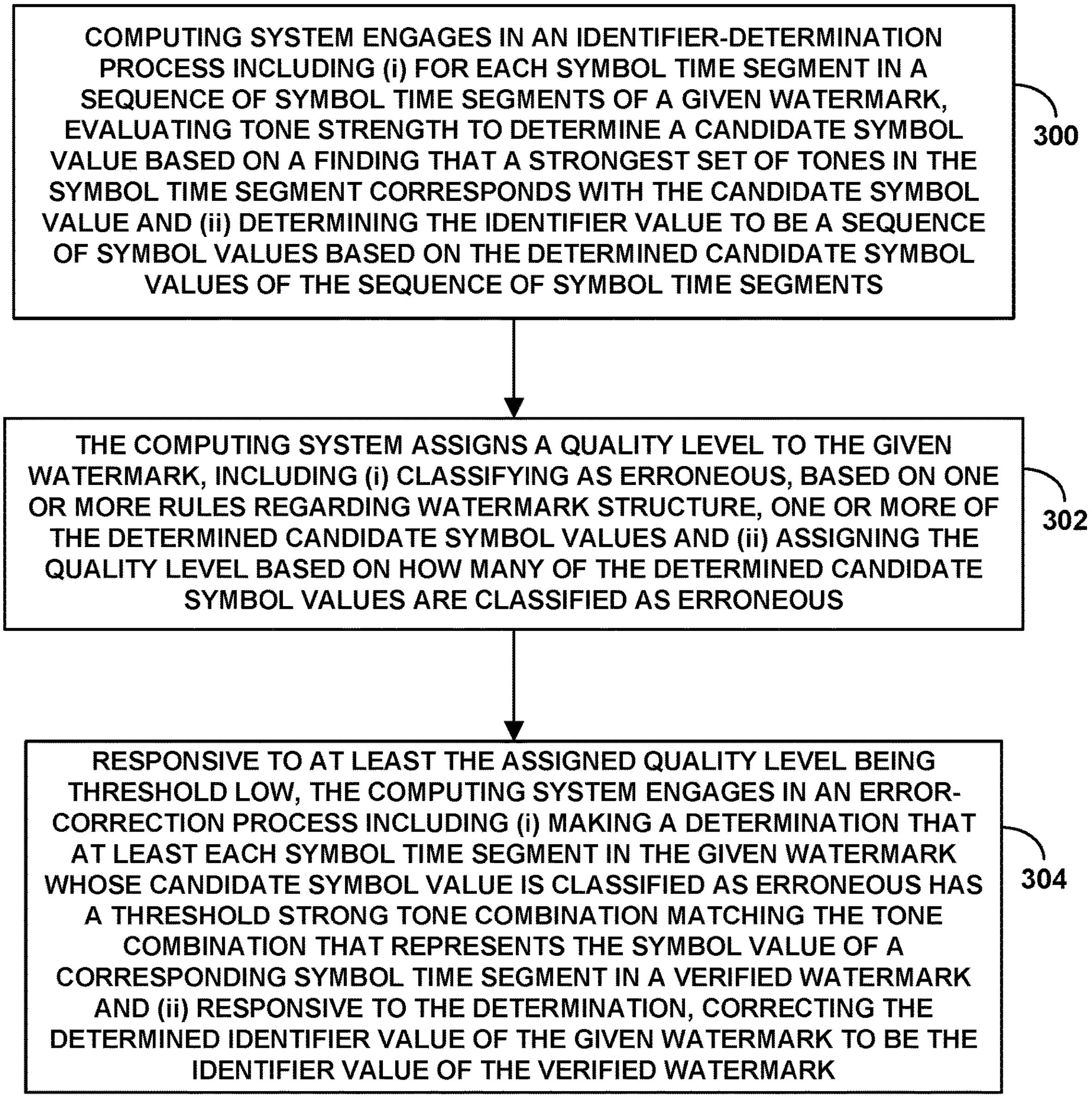
FIG. 3 is a flow chart depicting an example method.

FIG. 3 is a flow chart illustrating an example method for extracting an identifier value encoded in a given watermark in media content having a sequence of watermarks. Each watermark in this sequence of watermarks may span a watermark duration that defines a sequence of symbol time segments and encodes a respective identifier value by including a sequence of symbols respectively in the sequence of symbol time segments. Further, each symbol could have a respective tone combination that corresponds with a respective symbol value.

The identifier in this method could be a SID or any other type of identifier, possibly one that is useable as a basis to identify the media content in a media-measurement system, i.e., a media-ratings system, or for that matter could be any data that may be usefully encoded in a watermark and that represents and thus indicates or identifies information. Further, this method could be carried out by a computing system which, as noted above, may be provided in a meter configured to receive and analyze the media content and/or may be provided in a separate device or system such as a cloud server or other entity that my interwork with such a meter.

As shown in FIG. 3, at block 300, the method includes the computing system engaging in an identifier-determination process including (i) for each symbol time segment in the sequence of symbol time segments of the given watermark, evaluating tone strength to determine a candidate symbol value based on a finding that a strongest set of tones in the symbol time segment corresponds with the candidate symbol value and (ii) determining the identifier value to be a sequence of symbol values based on the determined candidate symbol values of the sequence of symbol time segments.

Further, at block 302, the method includes, the computing system assigning a quality level to the given watermark, including (i) classifying as erroneous, based on one or more rules regarding watermark structure, one or more of the determined candidate symbol values and (ii) assigning the quality level based on how many of the determined candidate symbol values are classified as erroneous.

In addition, at block 304, the method includes, responsive to at least the assigned quality level being threshold low, the computing system engaging in an error-correction process including (i) making a determination that at least each symbol time segment in the given watermark whose candidate symbol value is classified as erroneous has a threshold strong tone combination matching the tone combination that represents the symbol value of a corresponding symbol time segment in a verified watermark and (ii) responsive to the determination, correcting the determined identifier value of the given watermark to be the identifier value of the verified watermark. To facilitate this operation, the computing system may determine that the quality level assigned to the given watermark is threshold low, e.g., that it is at least as low as a predefined threshold level.

In line with the discussion above, the act of making the determination that a given symbol time segment in the given watermark has a threshold strong tone combination matching the tone combination that represents the symbol value of the corresponding symbol time segment in the verified watermark could involve (a) determining the tone combination of the corresponding symbol time segment in the verified watermark and (b) determining that the same determined tone combination in the given symbol time segment of the given watermark is threshold strong.

Further, as discussed above, the act of determining that the same determined tone combination in the symbol time segment of the given watermark is threshold strong could involve (i) computing a ratio of strength of the determined tone combination in the given symbol to an average strength of symbol-value time segment of the given watermark and (ii) deeming the determined tone combination to be threshold strong responsive to the computed ratio being at least as high as a predefined threshold level.

As additionally discussed above, the act of making the determination that at least each symbol time segment in the given watermark whose candidate symbol value is classified as erroneous has a threshold strong tone combination matching the tone combination that represents the symbol value of a corresponding symbol time segment in the verified watermark could involve making the determination as to each of the symbol time segments in the sequence of symbol time segments of the given watermark, including but not limited to each symbol time segment whose candidate symbol value is classified as erroneous.

Still further, as discussed above, the method could additionally involve the computing system identifying a particular watermark as the verified watermark, as a basis to engage in the error-correction process. Here, for instance, if the particular watermark encodes a particular identifier value, the act of identifying the particular watermark as the verified watermark could be based on (i) the particular watermark being assigned a quality level at least as high as a threshold high quality level and (ii) another threshold-recent watermark in the sequence of watermarks encoding the same particular identifier value and also being assigned a quality level at least as high as the threshold high quality level. The threshold-recent watermark in this arrangement could be a watermark that was present within the media content within a predefined period before the given watermark, wherein the predefined period is between 12 and 24 hours.

As further discussed above, the method could additionally involve the computing system determining that the verified watermark is useable as a basis for the error-correction process as to the given watermark. For instance, this could include determining that the given watermark is present in the media content both (i) within a predefined threshold short time frame after the verified watermark is present in the media content, such as a time frame that is no more than 15 minutes, and (ii) an integer multiple of the watermark duration after the verified watermark in the media content. The act of engaging in the error-correction process could then be additionally responsive to the determining that the verified watermark is useable as a basis for the error-correction process as to the given watermark.

Figure 4:
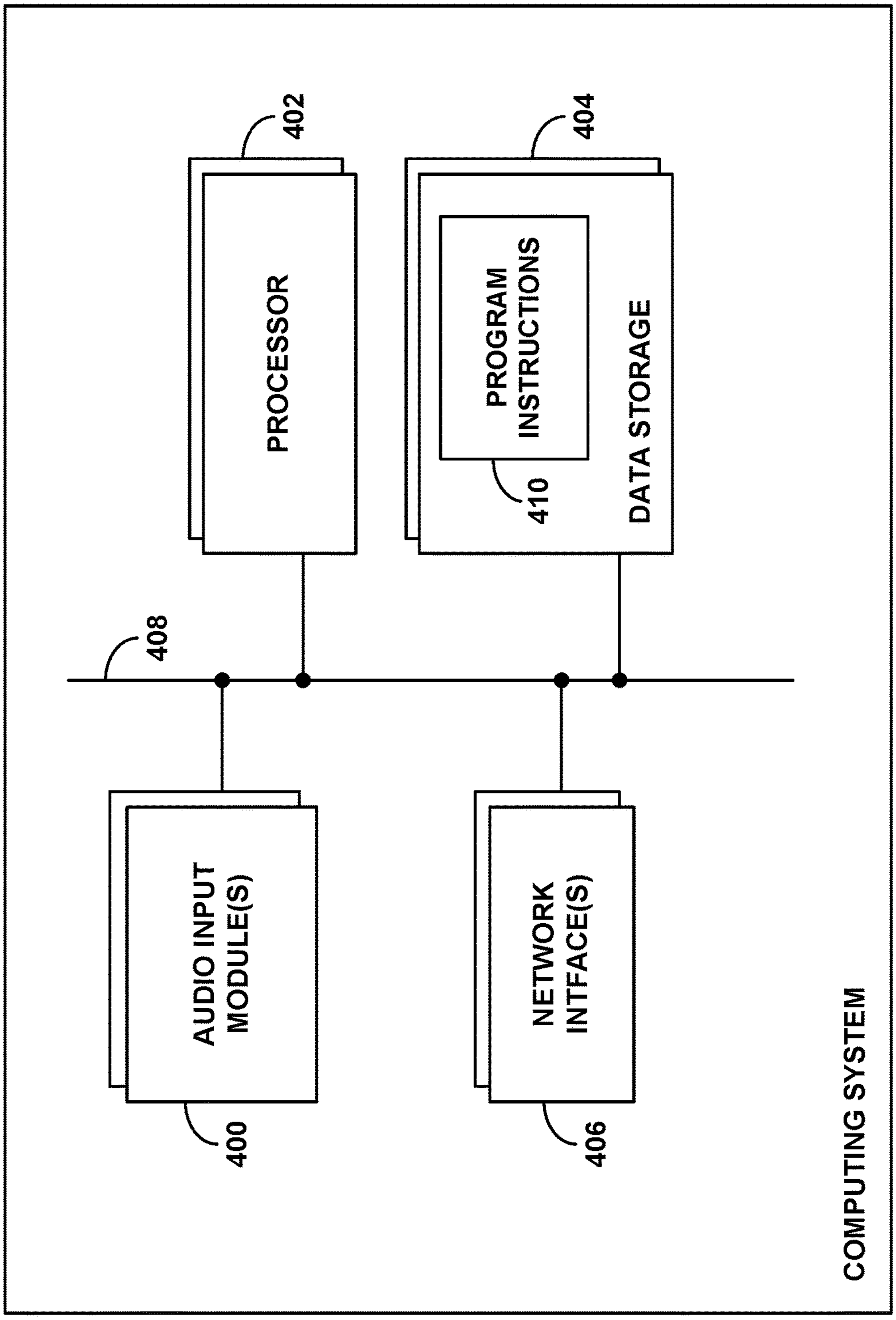
FIG. 4 is a simplified block diagram of an example computing system.

FIG. 4 is simplified block diagram depicting an example computing system that may carry out such a method. This computing system may represent an example meter and/or one or more other devices, as discussed above.

As shown in FIG. 4, the example computing system includes one or more audio-input modules 400, at least one processor 402, at least one non-transitory data storage 404, and at least one network interface 406, any or all of which may be interconnected together by one or more networks, system busses, and/or other connection mechanisms 408, among other possibilities.

The one or more audio-input modules 400 may comprise one or more microphones and/or other audio input mechanisms configured to receive acoustic audio from a panelist's environment and to provide associated one or more associated audio feeds, e.g., digitized audio feeds, for processing.

The at least one processor 402 may comprise one or more general purpose processing units (e.g., microprocessors) and/or one or more specialized processing units (e.g., digital signal processors, dedicated audio processors, dedicated watermark processors, etc.) Further, the at least one non-transitory data storage 404 may comprise one or more volatile and/or non-volatile storage components (e.g., flash, optical, magnetic, ROM, RAM, EPROM, EEPROM, etc.), which may be integrated in whole or in part with the one or more processors 402. As further shown, the at least one non-transitory data storage may store program instructions 410, which may be executable by the at least one processor 402 to carry out various computing-system operations described herein, such as those illustrated in FIG. 3 for instance.

The at least one network interface 208 may comprise one or more interfaces to facilitate wired and/or wireless communication between possibly one or more components of the computing system 100 and/or between the computing system 100 and one or more other entities, such as to facilitate internet communication, among other possibilities. For example, a network interface in a meter may enable the meter to report to a cloud server or other entity various information that the meter extracts from received audio signals, among other possibilities.

The present disclosure also contemplates at least one non-transitory computer readable medium that is encoded with, stores, or otherwise embodies program instructions executable by at least one processor to carry out various operations as described above.

Exemplary embodiments have been described above. Those skilled in the art will understand, however, that changes and modifications may be made to these embodiments without departing from the true scope and spirit of the invention.

What is claimed is:

1. A method for extracting an identifier value encoded in a given watermark in media content having a sequence of watermarks, wherein each watermark in the sequence of watermarks spans a watermark duration defining a sequence of symbol time segments and encodes a respective identifier value by including a sequence of symbols respectively in the sequence of symbol time segments, each symbol having a respective tone combination that corresponds with a respective symbol value, the method comprising:

engaging, by a computing system, in an identifier-determination process including (i) for each symbol time segment in the sequence of symbol time segments of the given watermark, evaluating tone strength to determine a candidate symbol value based on a finding that a strongest set of tones in the symbol time segment corresponds with the candidate symbol value and (ii) determining the identifier value to be a sequence of symbol values based on the determined candidate symbol values of the sequence of symbol time segments;

assigning, by the computing system, a quality level to the given watermark, including (i) classifying as erroneous, based on one or more rules regarding watermark structure, one or more of the determined candidate symbol values and (ii) assigning the quality level based on how many of the determined candidate symbol values are classified as erroneous; and responsive to at least the assigned quality level being threshold low, engaging, by the computing system, in an error-correction process including (i) making a determination that at least each symbol time segment in the given watermark whose candidate symbol value is classified as erroneous has a threshold strong tone combination matching the tone combination that represents the symbol value of a corresponding symbol time segment in a verified watermark and (ii) responsive to the determination, correcting the determined identifier value of the given watermark to be the identifier value of the verified watermark.

2. The method of claim 1, wherein making the determination that a given symbol time segment in the given watermark has a threshold strong tone combination matching the tone combination that represents the symbol value of the corresponding symbol time segment in the verified watermark comprises (a) determining the tone combination of the corresponding symbol time segment in the verified watermark and (b) determining that the same determined tone combination in the given symbol time segment of the given watermark is threshold strong.

3. The method of claim 2, wherein determining that the same determined tone combination in the symbol time segment of the given watermark is threshold strong comprises (i) computing a ratio of strength of the determined tone combination in the given symbol to an average strength of symbol-value time segment of the given watermark and (ii) deeming the determined tone combination to be threshold strong responsive to the computed ratio being at least as high as a predefined threshold level.

4. The method of claim 1, wherein making the determination that at least each symbol time segment in the given watermark whose candidate symbol value is classified as erroneous has a threshold strong tone combination matching the tone combination that represents the symbol value of a corresponding symbol time segment in the verified watermark comprises making the determination as to each of the symbol time segments in the sequence of symbol time segments of the given watermark, including but not limited to each symbol time segment whose candidate symbol value is classified as erroneous.

5. The method of claim 1, further comprising identifying, by the computing system, a particular watermark as the verified watermark, as a basis to engage in the error-correction process.

6. The method of claim 5, wherein the particular watermark encodes a particular identifier value, and wherein identifying the particular watermark as the verified watermark is based on (i) the particular watermark being assigned a quality level at least as high as a threshold high quality level and (ii) another threshold-recent watermark in the sequence of watermarks encoding the same particular identifier value and also being assigned a quality level at least as high as the threshold high quality level.

7. The method of claim 6, wherein the threshold-recent watermark is a watermark that was present within the media content within a predefined period before the given watermark, wherein the predefined period is between 12 and 24 hours.

8. The method of claim 1, further comprising:

determining, by the computing system, that the verified watermark is useable as a basis for the error-correction process as to the given watermark, wherein determining that the verified watermark is useable as a basis for the error-correction process as to the given watermark includes determining that the given watermark is present in the media content both (i) within a predefined threshold short time frame after the verified watermark is present in the media content and (ii) an integer multiple of the watermark duration after the verified watermark in the media content, wherein the engaging in the error-correction process is additionally responsive to the determining that the verified watermark is useable as a basis for the error-correction process as to the given watermark.

9. The method of claim 8, wherein the threshold short time frame is no more than 15 minutes.

10. The method of claim 1, wherein the determined identifier value is useable as a basis to identify the media content in a media-ratings system.

11. A computing system comprising:

at least one processor;

at least one non-transitory data storage; and program instructions stored in the at least one non-transitory data storage and executable by the at least one processor to carry out operations for extracting an identifier value encoded in a given watermark in media content having a sequence of watermarks, wherein each watermark in the sequence of watermarks spans a watermark duration defining a sequence of symbol time segments and encodes a respective identifier value by including a sequence of symbols respectively in the sequence of symbol time segments, each symbol having a respective tone combination that corresponds with a respective symbol value, the operations including:

engaging in an identifier-determination process including (i) for each symbol time segment in the sequence of symbol time segments of the given watermark, evaluating tone strength to determine a candidate symbol value based on a finding that a strongest set of tones in the symbol time segment corresponds with the candidate symbol value and (ii) determining the identifier value to be a sequence of symbol values based on the determined candidate symbol values of the sequence of symbol time segments, assigning a quality level to the given watermark, including (i) classifying as erroneous, based on one or more rules regarding watermark structure, one or more of the determined candidate symbol values and (ii) assigning the quality level based on how many of the determined candidate symbol values are classified as erroneous, and responsive to at least the assigned quality level being threshold low, engaging in an error-correction process including (i) making a determination that at least each symbol time segment in the given watermark whose candidate symbol value is classified as erroneous has a threshold strong tone combination matching the tone combination that represents the symbol value of a corresponding symbol time segment in a verified watermark and (ii) responsive to the determination, correcting the determined identifier value of the given watermark to be the identifier value of the verified watermark.

12. The computing system of claim 11, wherein making the determination that a given symbol time segment in the given watermark has a threshold strong tone combination matching the tone combination that represents the symbol value of the corresponding symbol time segment in the verified watermark comprises (a) determining the tone combination of the corresponding symbol time segment in the verified watermark and (b) determining that the same determined tone combination in the given symbol time segment of the given watermark is threshold strong.

13. The computing system of claim 12, wherein determining that the same determined tone combination in the symbol time segment of the given watermark is threshold strong comprises (i) computing a ratio of strength of the determined tone combination in the given symbol to an average strength of symbol-value time segment of the given watermark and (ii) deeming the determined tone combination to be threshold strong responsive to the computed ratio being at least as high as a predefined threshold level.

14. The computing system of claim 11, wherein making the determination that at least each symbol time segment in the given watermark whose candidate symbol value is classified as erroneous has a threshold strong tone combination matching the tone combination that represents the symbol value of a corresponding symbol time segment in the verified watermark comprises making the determination as to each of the symbol time segments in the sequence of symbol time segments of the given watermark, including but not limited to each symbol time segment whose candidate symbol value is classified as erroneous.

15. The computing system of claim 11, wherein the operations additionally include identifying a particular watermark as the verified watermark, as a basis to engage in the error-correction process.

16. The computing system of claim 15, wherein the particular watermark encodes a particular identifier value, and wherein identifying the particular watermark as the verified watermark is based on (i) the particular watermark being assigned a quality level at least as high as a threshold high quality level and (ii) another threshold-recent watermark in the sequence of watermarks encoding the same particular identifier value and also being assigned a quality level at least as high as the threshold high quality level.

17. The computing system of claim 11, wherein the operations additionally include:

determining that the verified watermark is useable as a basis for the error-correction process as to the given watermark, wherein determining that the verified watermark is useable as a basis for the error-correction process as to the given watermark includes determining that the given watermark is present in the media content both (i) within a predefined threshold short time frame after the verified watermark is present in the media content and (ii) an integer multiple of the watermark duration after the verified watermark in the media content, wherein the engaging in the error-correction process is additionally responsive to the determining that the verified watermark is useable as a basis for the error-correction process as to the given watermark.

18. The computing system of claim 11, wherein the computing system is disposed in a meter associated with a panelist, wherein the meter comprises at least one microphone for receiving audio from an environment of the meter, wherein the audio comprises the media content.

19. At least one non-transitory computer-readable medium having stored thereon program instructions executable by at least one processor to carry out operations extracting an identifier value encoded in a given watermark in media content having a sequence of watermarks, wherein each watermark in the sequence of watermarks spans a watermark duration defining a sequence of symbol time segments and encodes a respective identifier value by including a sequence of symbols respectively in the sequence of symbol time segments, each symbol having a respective tone combination that corresponds with a respective symbol value, the operations including:

engaging in an identifier-determination process including (i) for each symbol time segment in the sequence of symbol time segments of the given watermark, evaluating tone strength to determine a candidate symbol value based on a finding that a strongest set of tones in the symbol time segment corresponds with the candidate symbol value and (ii) determining the identifier value to be a sequence of symbol values based on the determined candidate symbol values of the sequence of symbol time segments;

assigning a quality level to the given watermark, including (i) classifying as erroneous, based on one or more rules regarding watermark structure, one or more of the determined candidate symbol values and (ii) assigning the quality level based on how many of the determined candidate symbol values are classified as erroneous; and responsive to at least the assigned quality level being threshold low, engaging in an error-correction process including (i) making a determination that at least each symbol time segment in the given watermark whose candidate symbol value is classified as erroneous has a threshold strong tone combination matching the tone combination that represents the symbol value of a corresponding symbol time segment in a verified watermark and (ii) responsive to the determination, correcting the determined identifier value of the given watermark to be the identifier value of the verified watermark.

20. The at least one non-transitory computer-readable medium of claim 19, wherein making the determination that a given symbol time segment in the given watermark has a threshold strong tone combination matching the tone combination that represents the symbol value of the corresponding symbol time segment in the verified watermark comprises (a) determining the tone combination of the corresponding symbol time segment in the verified watermark and (b) determining that the same determined tone combination in the given symbol time segment of the given watermark is threshold strong, and wherein determining that the same determined tone combination in the symbol time segment of the given watermark is threshold strong comprises (i) computing a ratio of strength of the determined tone combination in the given symbol to an average strength of symbol-value time segment of the given watermark and (ii) deeming the determined tone combination to be threshold strong responsive to the computed ratio being at least as high as a predefined threshold level.

* * * * *